US008301807B2

(12) United States Patent
Yamashita

(10) Patent No.: US 8,301,807 B2
(45) Date of Patent: Oct. 30, 2012

(54) DEVICE MANAGEMENT APPARATUS, DEVICE MANAGEMENT METHOD, AND RECORDING MEDIUM

(75) Inventor: Akihiro Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/041,718

(22) Filed: Mar. 7, 2011

(65) Prior Publication Data
US 2011/0231581 A1 Sep. 22, 2011

(30) Foreign Application Priority Data

Mar. 18, 2010 (JP) .................................. 2010-062240
Dec. 22, 2010 (JP) .................................. 2010-286250

(51) Int. Cl.
G06F 3/00 (2006.01)
G06F 13/00 (2006.01)
(52) U.S. Cl. ............................ 710/14; 710/8; 710/104
(58) Field of Classification Search .................. None
See application file for complete search history.

(56) References Cited

U.S. PATENT DOCUMENTS

| 5,448,724 | A | * | 9/1995 | Hayashi ........................ 714/4.1 |
| 6,182,157 | B1 | * | 1/2001 | Schlener et al. .............. 719/318 |
| 6,363,411 | B1 | * | 3/2002 | Dugan et al. .................. 709/202 |
| RE37,987 | E | * | 2/2003 | Yamunachari et al. ....... 709/224 |
| 6,854,011 | B2 | * | 2/2005 | Kim .............................. 709/224 |
| 6,930,985 | B1 | * | 8/2005 | Rathi et al. .................... 370/254 |
| 7,640,551 | B2 | * | 12/2009 | Obert ............................. 719/318 |
| 7,665,097 | B2 | * | 2/2010 | Rodrigues et al. ............ 719/318 |
| 7,996,906 | B2 | * | 8/2011 | Nath et al. ....................... 726/24 |
| 8,001,404 | B2 | * | 8/2011 | Pathak ........................... 713/320 |
| 2003/0112765 | A1 | * | 6/2003 | Gaspard et al. .............. 370/252 |
| 2004/0006619 | A1 | * | 1/2004 | Syed et al. .................... 709/224 |
| 2004/0128370 | A1 | * | 7/2004 | Kortright ...................... 709/221 |
| 2005/0015685 | A1 | * | 1/2005 | Yamamoto ...................... 714/54 |
| 2005/0086654 | A1 | * | 4/2005 | Sumi et al. .................... 717/171 |
| 2008/0107131 | A1 | * | 5/2008 | Ma .................................. 370/468 |
| 2009/0128370 | A1 | * | 5/2009 | Hofer et al. ..................... 341/22 |

FOREIGN PATENT DOCUMENTS

| JP | 3161369 | 4/2001 |
| JP | 2003-296206 | 10/2003 |
| JP | 2007-096586 | 4/2007 |
| JP | 4232635 | 3/2009 |

* cited by examiner

*Primary Examiner* — Henry Tsai
*Assistant Examiner* — Jing-Yih Shyu
(74) *Attorney, Agent, or Firm* — IPUSA, PLLC

(57) ABSTRACT

A device management apparatus is connected to a plurality of devices via a network and includes a processing unit. The processing unit includes a trap setting part that defines a trap setting of each device, a storing part that stores device information of each device, transmitted by a trap processing of each device, in a predetermined storage area of a storage device as device management information of management object devices, and an excepting part which deletes device information of a device from the device management information. When an exception request for excepting exception devices from the management object devices is received, the trap setting part changes a trap setting of each exception device to an OFF state and the excepting part deletes device information of each exception device from the device management information.

5 Claims, 13 Drawing Sheets

FIG.5

| DEVICE ID | DEVICE TYPE | STATUS | TRAP SETTING | ... |
|---|---|---|---|---|
| 192.168.1.101 | MFP_M1 | CAUTION | ON | ... |
| 192.168.1.102 | MFP_M2 | USABLE | ON | ... |
| 192.168.1.103 | MFP_M3 | USABLE | ON | ... |
| 192.168.1.104 | MFP_M3 | LACK OF TONER | OFF | ... |
| 192.168.1.105 | MFP_M1 | USABLE | OFF | ... |
| 192.168.1.106 | MFP_M4 | NO REPLY | ON | ... |
| 192.168.1.107 | MFP_M3 | USABLE | OFF | ... |
| 192.168.1.108 | MFP_M4 | NO REPLY | OFF | ... |
| 192.168.1.109 | MFP_M5 | USABLE | ON | ... |
| ... | ... | ... | ... | ... |

■ DEVICE LIST

PLEASE SELECT DEVICES TO BE EXCEPTED FROM MANAGEMENT OBJECTS

| EXCEPTION | DEVICE ID | DEVICE TYPE |
|---|---|---|
| ● | 192.168.1.101 | MFP_M1 |
| ● | 192.168.1.102 | MFP_M2 |
| ..... | 192.168.1.103 | MFP_M3 |
| ..... | ..... | ..... |

W1

OK    Cancel

FIG.6B

■ CHECKING BEFORE EXECUTION

THE FOLLOWING DEVICES WILL BE EXCEPTED FROM MANAGEMENT OBJECTS.
PLEASE CHECK THE STATUS OF TRAP SETTING OF EACH DEVICE.

| EXCEPTION | DEVICE ID | DEVICE TYPE | STATUS | TRAP SETTING |
|---|---|---|---|---|
| ● | 192.168.1.101 | MFP_M1 | CAUTION | ON |
| ● | 192.168.1.103 | MFP_M3 | USABLE | ON |
| ● | 192.168.1.105 | MFP_M1 | USABLE | OFF |
| ● | 192.168.1.107 | MFP_M3 | USABLE | OFF |

IS EXCEPTION OF THE DEVICES PERFORMED ?

OK    Cancel

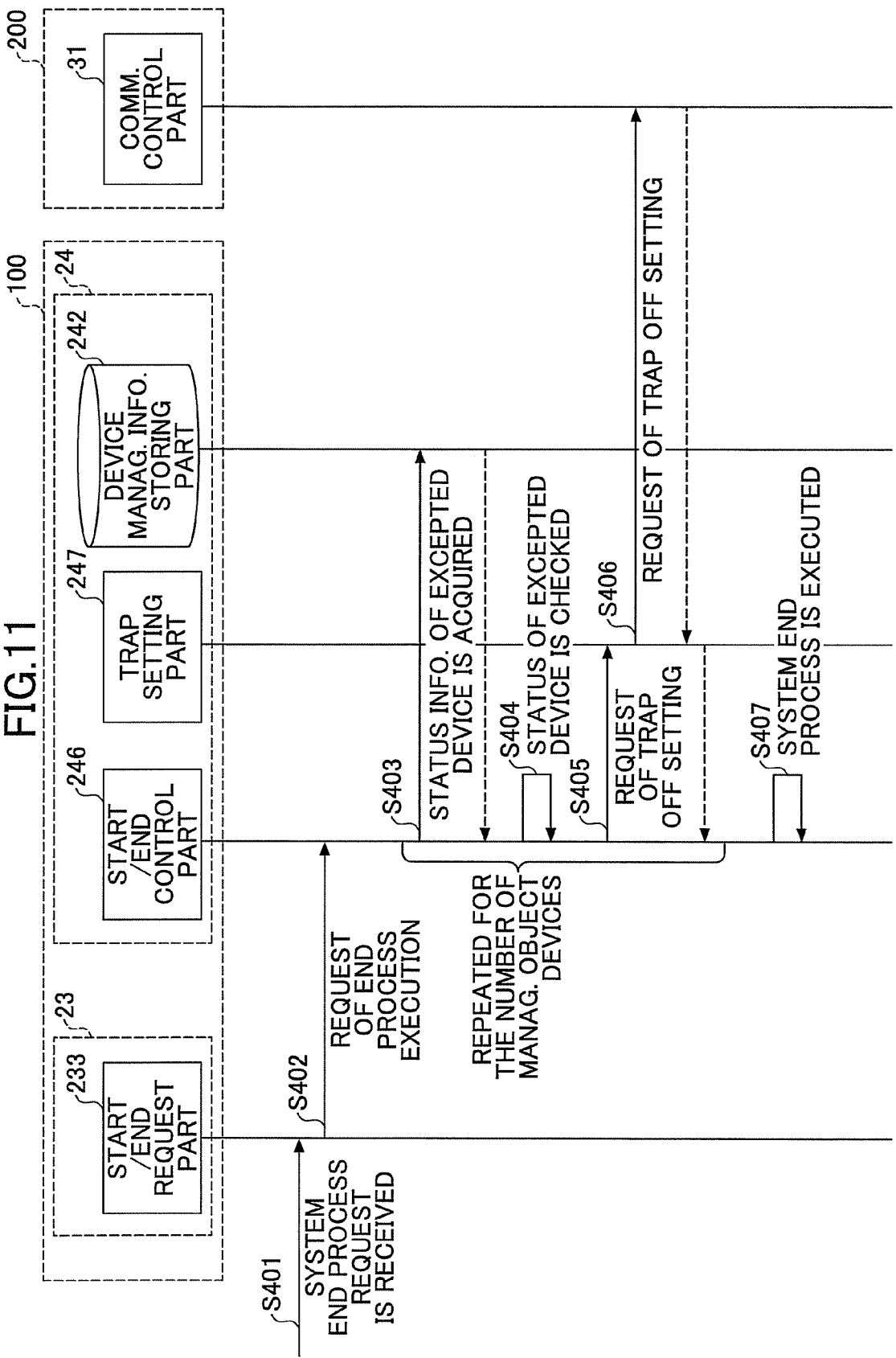

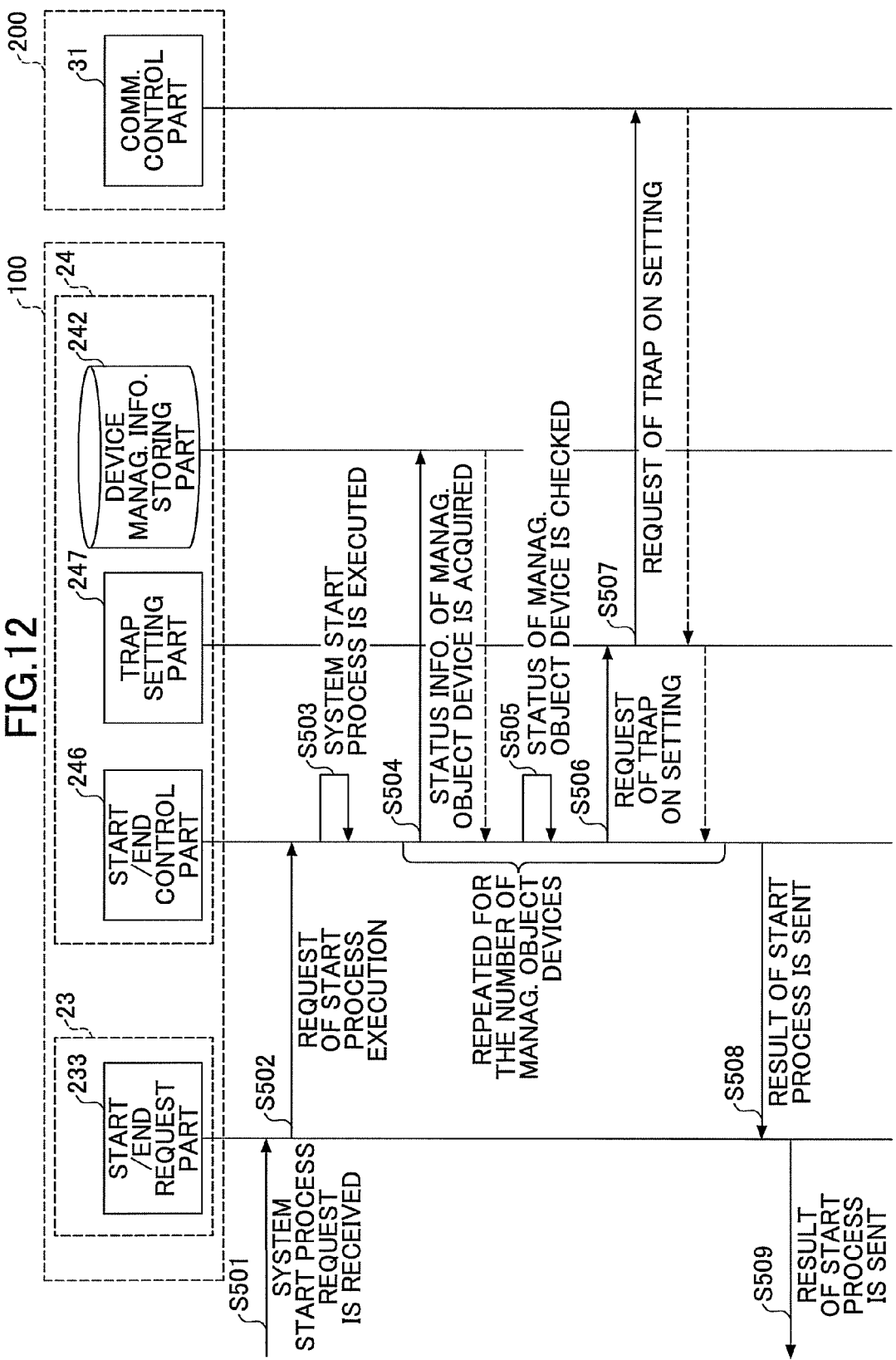

DEVICE MANAGEMENT APPARATUS, DEVICE MANAGEMENT METHOD, AND RECORDING MEDIUM

The present application is based upon and claims the benefit of priority of the prior Japanese patent application No. 2010-062240, filed on Mar. 18, 2010, and the prior Japanese patent application No. 2010-286250, filed on Dec. 22, 2010, the contents of which are incorporated herein by reference in their entirety.

BACKGROUND OF THE INVENTION

1. Field of the Invention

The present disclosure generally relates to a device management apparatus and method for managing one or a plurality of network devices which are connected via a network and more particularly to a device management apparatus and method for controlling transmission of the device information by the network devices using a trap processing.

2. Description of the Related Art

In recent years, various network devices, such as image processing devices, are introduced in office environments. There is a request for a system administrator to supervise the states of the network devices and efficiently manage the network devices. For this purpose, a device management system which manages a plurality of network devices which are connected via a network, in a unified manner has been introduced in office environments.

When there are many network devices that are management objects in the office environments, an important issue of the device management system is how to supervise the states of the network devices in the network, or a method of acquiring device information of the network devices.

For example, Japanese Laid-Open Patent Publication No. 2003-296206 discloses a system for managing network devices wherein trap processing and polling processing are properly used as a method of acquiring the device information from the network devices in SNMP (simple network management protocol). The trap processing is a process which is used to dynamically report device information of a network device to a management station when a change of the state of the network device is detected. Even if an information acquisition request from the management station is not transmitted to the network device, the management station is able to acquire the device information from the network device.

On the other hand, the polling processing is a process which is used to periodically transmit an information acquisition request from the management station to each of the network devices, and accordingly the management station acquires the device information from each network device.

However, in the method of acquiring the device information using the trap processing according to the related art, even after a network device is excepted from the management objects, the trap setting of the excepted device remains unchanged (or the trap setting being kept in an ON state). Hence, the device information from the excepted device will be transmitted to the management station, and there is a problem that the communication load is unnecessarily increased.

It is difficult for the device information acquiring method according to the related art to change the trap setting of an excepted network device to an OFF state (or cancels the trap setting) in accordance with a change of the state of the network device. Hence, it is difficult for the device information acquiring method according to the related art to avoid the useless communication between the management station and the network device in the device management system.

SUMMARY OF THE INVENTION

In one aspect, the present disclosure provides a device management apparatus, a device management method, and a recording medium which are adapted to avoid the useless communication between the device management apparatus and the network device by cancelling a trap processing of the network device in accordance with a change of the state of the network device.

In an embodiment which solves or reduces one or more of the above-mentioned problems, the present disclosure provides a device management apparatus which is connected to a plurality of devices via a network and includes a processing unit, the processing unit including: a trap setting part that defines a trap setting of each of the plurality of devices; a storing part that stores device information of each of the plurality of devices, transmitted to the device management apparatus by a trap processing of each of the plurality of devices, in a predetermined storage area of a storage device as device management information of management object devices; and an excepting part that deletes device information of a device from the device management information stored by the storing part, wherein, when an exception request for excepting exception devices from the management object devices is received, the trap setting part changes a trap setting of each of the exception devices to an OFF state and the excepting part deletes device information of the exception devices from the device management information stored by the storing part.

In an embodiment which solves or reduces one or more of the above-mentioned problems, the present disclosure provides a device management method for use in a device management apparatus which is connected to a plurality of devices via a network and includes a processing unit, the processing unit including a trap setting part, a storing part that stores device information of each of the plurality of devices in a predetermined storage area of a storage device as device management information of management object devices, and an excepting part that deletes device information of a device from the device management information, the device management method including: receiving, by the excepting part, an exception request for excepting exception devices from the management object devices; changing, by the trap setting part, when the exception request is received, a trap setting of each of the exception devices to an OFF state; and deleting, by the excepting part, device information of the exception devices from the device management information stored in the predetermined storage area of the storage device.

Other objects, features and advantages of the present disclosure will become more apparent from the following detailed description when read in conjunction with the accompanying drawings.

BRIEF DESCRIPTION OF THE DRAWINGS

FIG. 5 is a diagram showing an example of data of the device management information of the first embodiment.

FIG. 6A and FIG. 6B are diagrams showing examples of display screens related to device exception of the first embodiment.

FIG. 11 is a sequence diagram for explaining a control process of the second embodiment which turns off the trap setting of network devices at a time of a system end process.

FIG. 12 is a sequence diagram for explaining a control process of the second embodiment which turns on the trap setting of network devices at a time of a system start process.

DETAILED DESCRIPTION OF THE PREFERRED EMBODIMENTS

A description will be given of embodiments of the present disclosure with reference to the accompanying drawings.

First Embodiment

Figure 1:
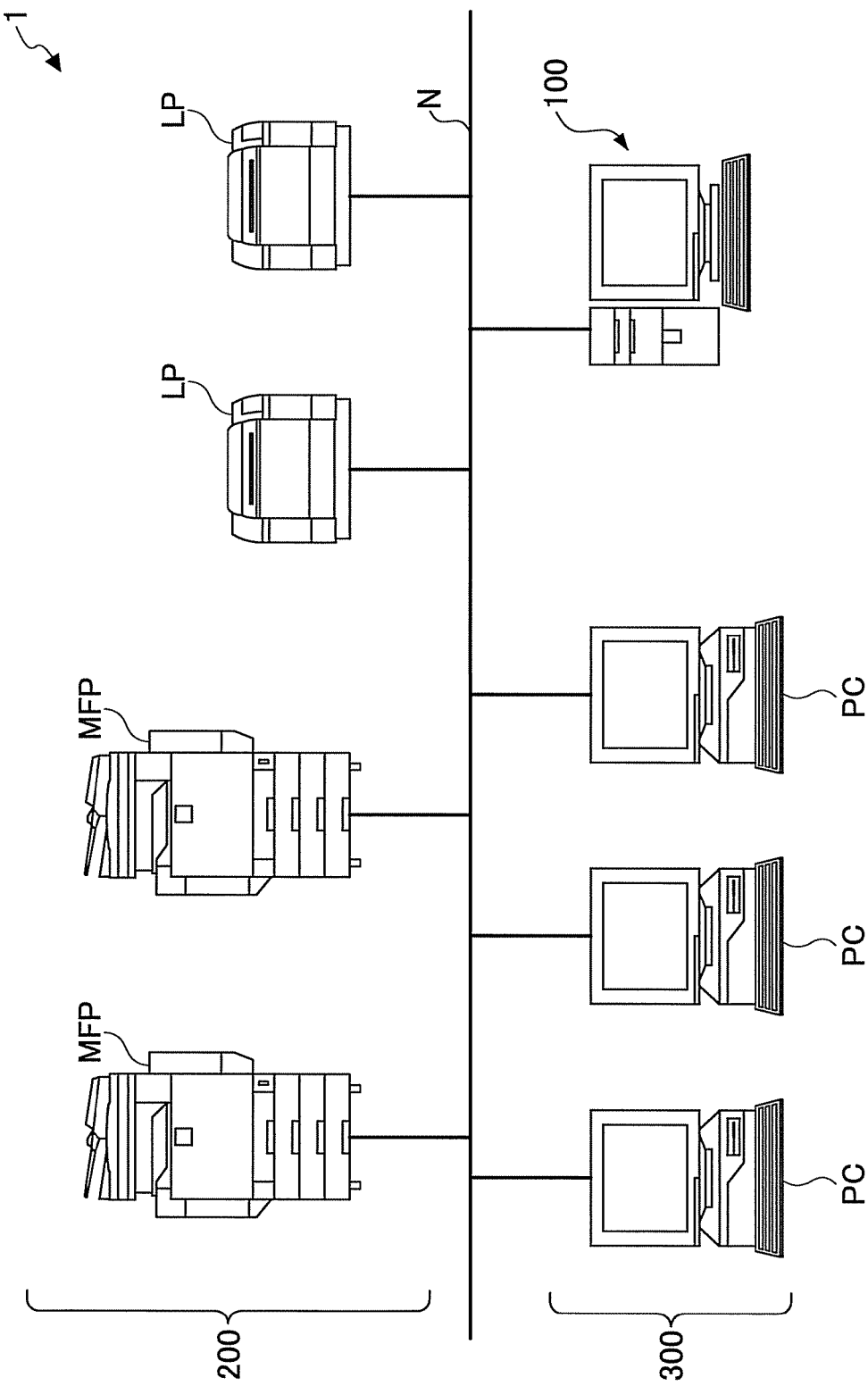
FIG. 1 is a diagram showing the composition of a device management system of a first embodiment of the present disclosure.

FIG. 1 is a diagram showing the composition of a device management system 1 of this embodiment. As shown in FIG. 1, the device management system 1 includes one or a plurality of image processing devices (management object devices) 200, and a device management apparatus (device management server) 100 which are interconnected by a network N (e.g., a LAN).

The image processing devices 200 are devices used in the office environments, such as MFP (multi-function peripherals) and LP (laser printers), and serve as management object devices of the device management apparatus 100 after the devices are introduced therein. Each of the devices 200 transmits device information to the device management apparatus 100 by a trap processing as mentioned above. In the following, each of the image processing devices 200 will be called "device 200".

The PC (personal computer) 300 is an information processing device which is used by a user to send a process execution request to the devices 200 or the device management apparatus 100 or receive a result of the executed process or a variety of management information items from the devices 200 or the device management apparatus 100.

The device management apparatus 100 is an information processing device which manages the devices 200 in a unified manner based on the device information (which includes device identification information, status information, etc.) acquired from the devices 200. This unified management may include monitoring and operational management of the devices, information management of the devices, etc.

As mentioned above, the device management system 1 is arranged in the above-described composition to provide the device management services.

Figure 2:
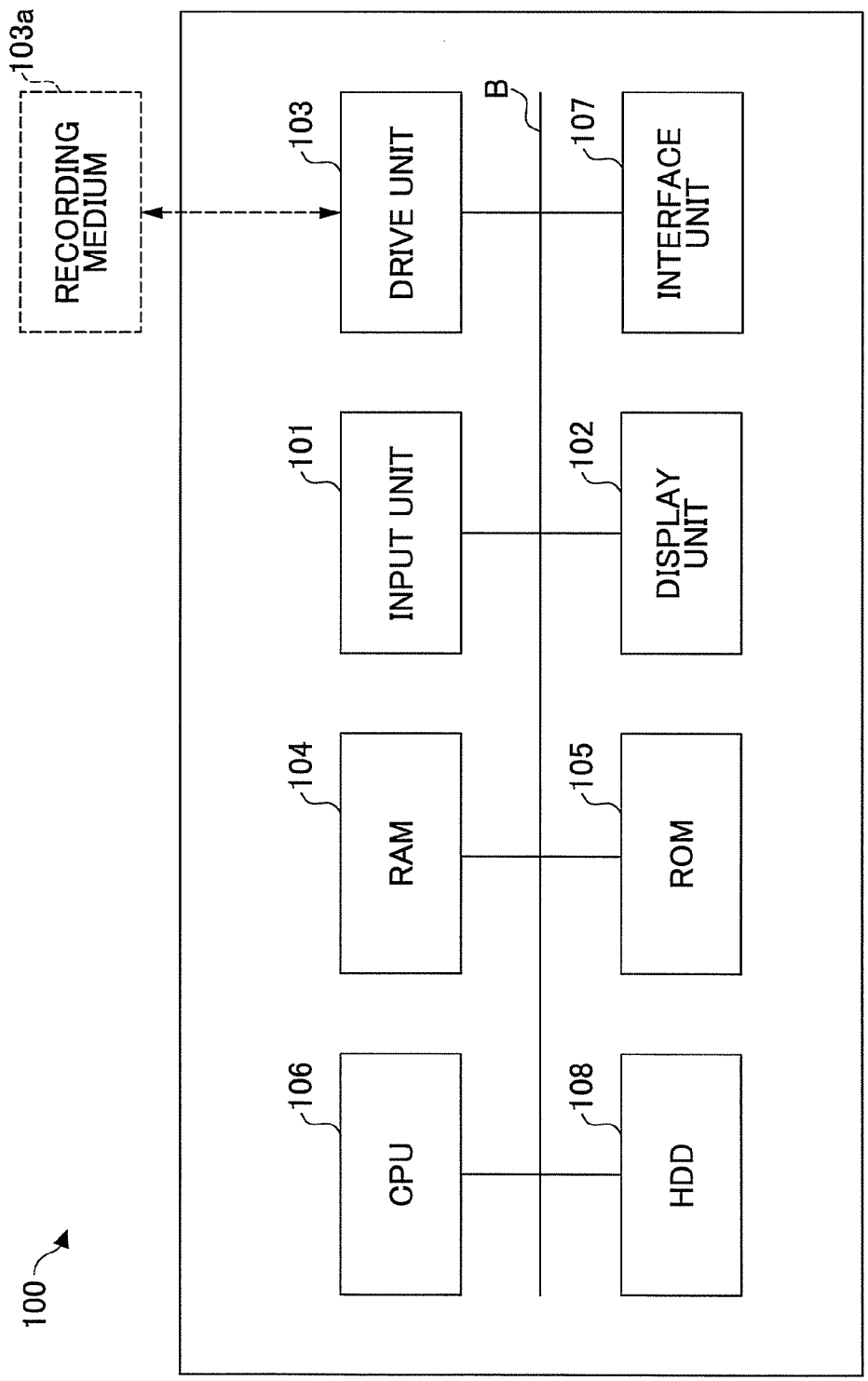
FIG. 2 is a diagram showing the hardware composition of a device management apparatus of the first embodiment.

FIG. 2 is a diagram showing the hardware composition of the device management apparatus 100 of this embodiment. As shown in FIG. 2, the device management apparatus 100 includes an input unit 101, a display unit 102, a drive unit 103, a RAM (random access memory) 104, a ROM (read only memory) 105, a CPU (central processing unit) 106, an interface unit 107, and a HDD (hard disk drive) 108, and these units are interconnected by a bus B.

The input unit 101 includes a keyboard, a mouse, etc., and is provided for inputting a variety of operational signals to the device management apparatus 100. The display unit 102 includes a display, etc., and displays the processing result output from the device management apparatus 100

The interface unit 107 is provided to connect the device management apparatus 100 to the network N. The device management apparatus 100 can communicate with the devices 200 and the PC 300 through the interface unit 107.

The HDD 108 is a nonvolatile storage device which stores various programs and data. The programs stored in the HDD 108 may include the basic software or the operating system (OS), such as "Windows (registered trademark)" or "UNIX (registered trademark)", which controls the whole device management apparatus 100, and application programs which perform various functions on the operating system. The HDD 108 is arranged to manage the programs and the data stored therein by using a predetermined file system and/or DB (database).

The drive unit 103 is arranged to provide an interface with a recording medium 103a which is detachably disposed in the drive unit 103. By using the drive unit 103, the device management apparatus 100 is able to access the recording medium 103a (reading and/or writing of the recording medium 103a). Examples of the recording medium 103a may include a floppy disk, a CD (compact disk), a DVD (digital versatile disk), an SD memory card (SD memory card), a USB (universal serial bus) memory, etc.

The ROM 105 is a nonvolatile semiconductor memory (storage device) which can hold internal data even if the power is turned off. In the ROM 105, the BIOS (basic input/output system) which is executed when starting the device management apparatus 100, and the data of the system configuration of the device management apparatus 100, the network related setting, etc., are stored.

The RAM 104 is a volatile semiconductor memory (storage device) which temporarily holds the programs and data which are read from the various recording media or the storage devices.

The CPU 106 loads the programs to the RAM 104 and executes the programs to control the whole device management apparatus 100.

As mentioned above, the device management apparatus 100 is arranged in the above-mentioned hardware composition to provide a variety of information processing services by executing the software installed.

Figure 3:
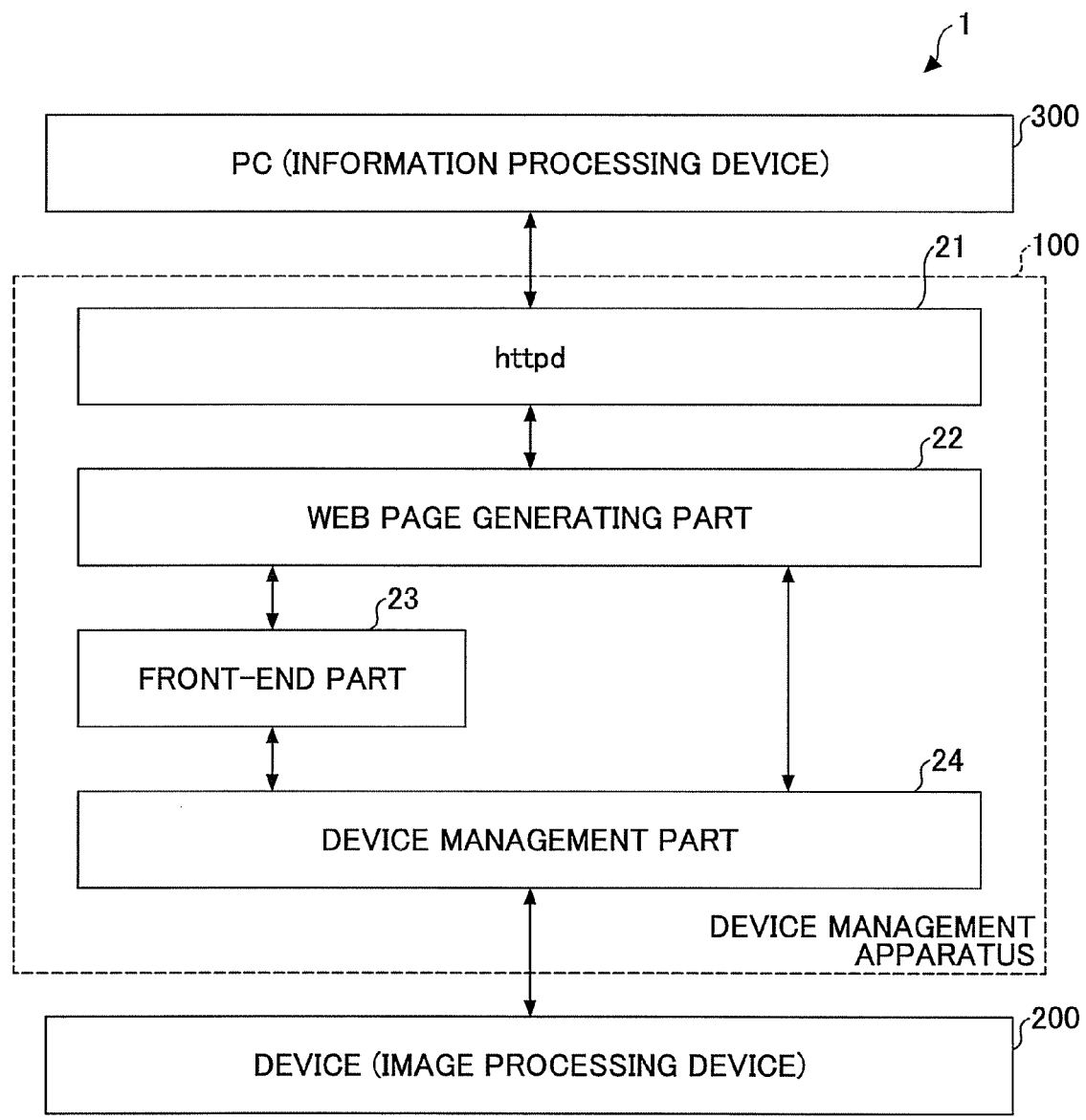
FIG. 3 is a diagram showing the software composition of the device management apparatus of the first embodiment.

FIG. 3 is a diagram showing the software composition of the device management apparatus 100 of this embodiment. As shown in FIG. 3, the device management apparatus 100 includes a software group including a httpd (hypertext transfer protocol daemon) 21, a Web page generating part 22, a front-end part 23, and a device management part 24, and these elements are installed in the device management apparatus 100.

The httpd 21 is a program on a Web server residing on the operating system, and the httpd 21 receives an operation request from a viewer application (browser) and transmits the content stored in the server to the viewer application in response to the request.

The Web page generating part 22 generates a Web page based on the request received at the httpd 21, and the Web page is displayed on the viewer application.

The front-end part 23 acquires from the device management part 24 (which will be described below) data which is necessary for generating the Web page by the Web page generating part 22, and processes the acquired data to output the data for generating the Web page.

The device management part 24 performs the monitoring of the devices 200, the acquiring of the device information (reception of the device information transmitted by a trap processing), various data management including the management of the acquired information, and various data operation of a request-dependent searching, updating, excepting, etc., in order to perform the device management function. The device management part 24 controls the operation of a system start process, a system stop process, a system end process, etc.

In the software composition of this embodiment, the device management part 24 is a function element which is provided in the device management apparatus 100 as the software to perform the device management function. The httpd 21, the Web page generating part 22, and the front-end part 23 are function elements which are provided in the device management apparatus 100 as the software to perform the information providing function that provides the relevant information to the PC 300.

Next, the device management function of this embodiment will be described.

The device management apparatus 100 of this embodiment is arranged to have a device management function that, when an exception request for excepting a device 200 from the management objects is received, a trap setting of the device 200 is set to an OFF state and the device information of the device 200 is excepted or deleted from the device information (device management information) of the management object devices currently stored in a predetermined storage area of the storage device.

A trap is one of SNMP commands, and this command is used to send an alert for relevant information from an SNMP agent to an SNMP manager. Specifically, in the case of this embodiment, an SNMP manager operates on the device management apparatus 100 and an SNMP agent operates on the device 200 (each of the management object devices). Hence, a trap processing is performed by the SNMP agent operating on the device 200, and the relevant information of the alert sent by the trap processing is the device information of the device 200.

Hence, in this embodiment, the following trap processing is performed between the device management apparatus 100 and the device 200. For example, if a certain event, such as a change of the state of the device 200, is detected, the device 200 generates notification information including the device information based on the detected event. The device 200 transmits the generated notification information to the device management apparatus 100 based on the network setting information (transmission destination information) that is set beforehand as a transmission destination. As a result, the device information of the device 200 is actively notified from the device 200 to the device management apparatus 100.

In the information acquisition method using the trap processing according to the related art, even after a device 200 is excepted from the management objects, the device information of the device 200 will be transmitted to the device management apparatus 100. That is, useless communication between the device management apparatus 100 and the device 200 may arise.

To eliminate the problem, the device management apparatus 100 of this embodiment is arranged so that, when a device 200 is excepted from the management objects, a remote setting is performed to dynamically change the trap setting of the corresponding device to an OFF state.

The trap setting of a device 200 is a setting to control the continuation or the stop of the trap processing being performed by the device 200. Setting the trap setting of a device 200 to an ON state is to continue the trap processing being performed by the device 200. Setting the trap setting of a device 200 to an OFF state is to stop the trap processing being performed by the device 200. Hence, the device management apparatus 100 changes the trap setting of a device 200 to control the continuation or the stop of the trap processing being performed by the device 200.

Accordingly, when a device 200 is deleted from the management objects, the device management apparatus 100 changes the trap setting of the device 200 from an ON state to an OFF state, and stops the trap processing being performed by the device 200. In the device management apparatus 100 of this embodiment, by controlling the management state of the device 200, it is possible to prevent the useless communication from being performed by the trap processing of the device 200, and it is possible to reduce the communication load between the device management apparatus 100 and the device 200.

Next, the composition and the operation of the device management function of this embodiment will be described.

Figure 4:
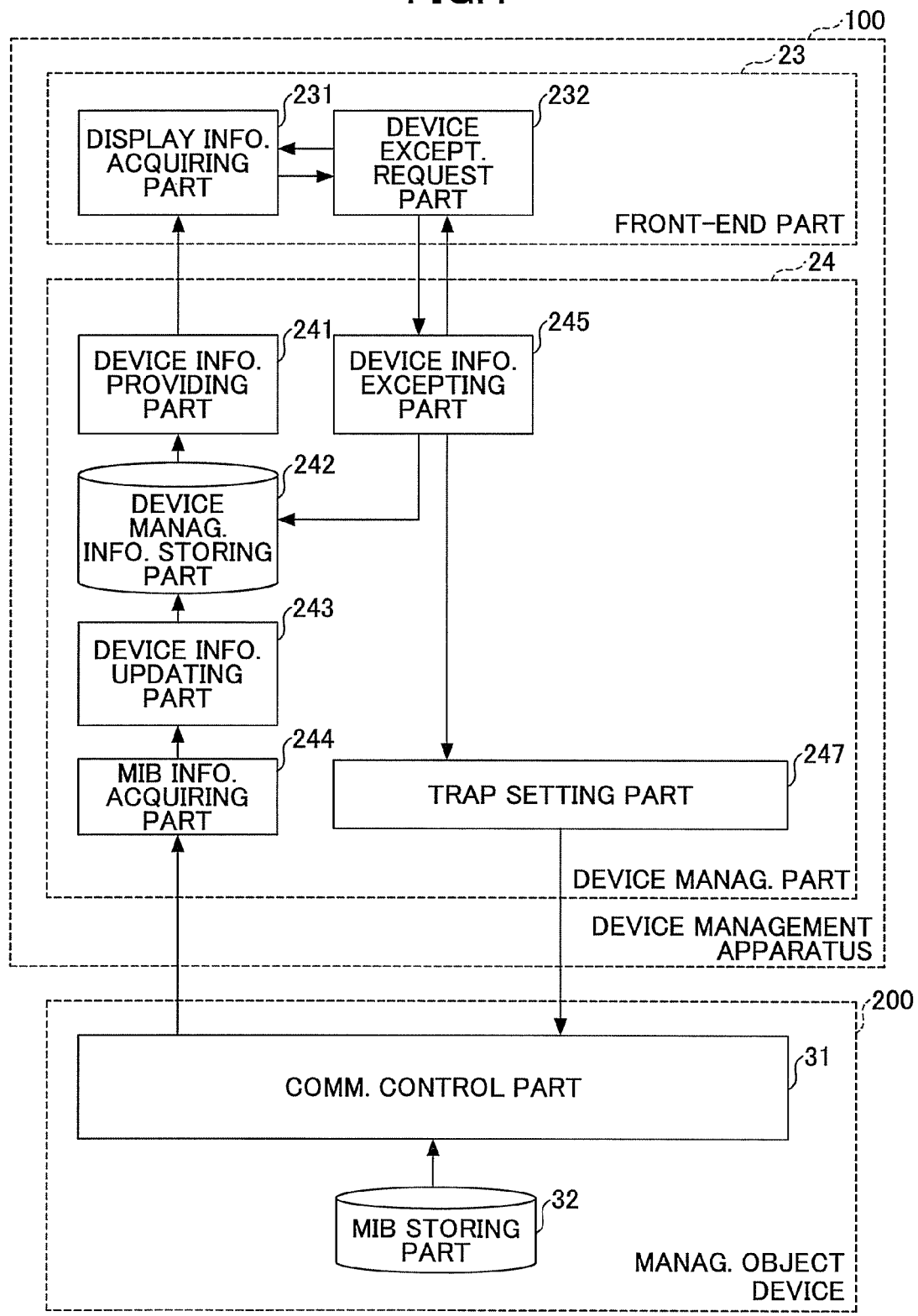
FIG. 4 is a diagram showing the functional composition of the device management system of the first embodiment.

FIG. 4 is a diagram showing the functional composition of the device management system 1 of this embodiment. As shown in FIG. 4, the device management system 1 includes a display information acquiring part 231, a device exception request part 232, a device information providing part 241, a device information updating part 243, a management information base (MIB) acquiring part 244, a device information excepting part 245, a trap setting part 247, and a communication control part 31.

Each of the display information acquiring part 231, the device exception request part 232, the device information providing part 241, the device information updating part 243, the management information base acquiring part 244, the device information excepting part 245, and the trap setting part 247 is a function element provided in the device management apparatus 100, and the communication control part 31 is a function element provided in the device 200.

Among the above-mentioned function elements of the device management apparatus 100, the display information acquiring part 231 and the device exception request part 232 are the function elements which are provided by executing the software program of the front-end part 23. The device information providing part 241, the device information updating part 243, the management information base acquiring part 244, the device information excepting part 245, and the trap setting part 247 are the function elements which are provided by executing the software program of the device management part 24.

The display information acquiring part 231 is a function element which acquires information required at a time of displaying information, such as a result of request processing or viewing of the information. For example, when display information of a device list screen is requested from the Web page generating part 22, the display information acquiring part 231 sends an information acquisition request to the device information providing part 241, and acquires the device information from the device information providing part 241 as the response to the information acquisition request.

The display information acquiring part 231 converts the acquired device information into display information of a device list screen, and transmits the display information to the requesting part.

The device exception request part 232 is a function element which requests the device information excepting part 245 to delete the device management information of a device 200 for which an exception request for excepting the device 200 from the management objects is received (which device will be called "exception device"). When an exception request is received, the device exception request part 232 transmits display information of a checking screen received from the display information acquiring part 231, to the Web page generating part 22, and provides a user with the checking screen displayed at a time of the device exception.

The device information providing part 241 is a function element which acquires the device information of the management object devices from the device management information storing part 242. The device management information storing part 242 is equivalent to, for example, a predetermined storage area of a storage device (for example, a HDD) provided in the device 200. In the device management information storing part 242, various data including the device information is managed in a manner of the data of device management information as shown in FIG. 5.

FIG. 5 is a diagram showing an example of the data of device management information 242D of this embodiment. In the example of the data of the device management information 242D shown in FIG. 5, respective information items, including the device identification, the device type, the status, and the trap setting, are associated and stored.

Each item of the device identification is an item which indicates the identification information (device identification information) of the device 200. The value of this item may be a device-specific value, such as a serial number (machine serial number), or a network setting value assigned to the device 200, such as an IP address (Internet protocol address) or a MAC address (media access control address), etc. Each item of the device type is an item which indicates the identification information (model identification information) of the model of the device 200. The value of this item may be a model name, a model ID, etc. Each item of the status is an item which indicates the status information of the device 200. The value of this item may be a status value, such as "usable", "no reply", etc. Each item of the trap setting is an item which indicates the trap setting information set in the device 200. The value of this item may be a control value such as "ON" or "OFF".

The device management information 242D contains a set of information items of the device information of a management object device in which these information items are associated, and is constructed by a plurality of information sets in accordance with the number of management object devices.

Referring back to FIG. 4, the device information providing part 241 accesses the device management information storing part 242, and acquires a set of the device information corresponding to the specific device from among the plurality of sets of the device information by referring to the device management information 242D based on the device identification information acquired from the device 200.

The device information updating part 243 is a function element which updates the content of the device information managed by the device management information storing part 242. The device information updating part 243 accesses the device management information storing part 242, and refers to the device management information 242D based on the device identification information included in the device information acquired from the device 200. As a result, the device information updating part 243 determines the storage area in which the device information of the device 200 which is an update object (which device will be called "update object device") is stored.

The device information updating part 243 stores the item value of the received device information to the determined storage area and updates the data. When the storage area in which the device information of the update object device is stored is not able to be determined, the device information updating part 243 determines that a new registration of the device information is needed, and generates or secures a new storage area. The device information updating part 243 stores the item value of the received device information to the generated storage area and registers the data.

The management information base (MIB) acquiring part 244 is a function element which acquires a management information base (MIB information) from the management object devices as the device information via a predetermined communication protocol. A management information base is information which is published by the network device managed in the SNMP in order to notify its own state to the external devices.

By the trap processing, the management information base acquiring part 244 receives the management information base sent from the device 200, and acquires the device information of the device 200.

The management information base acquiring part 244 transmits the acquired device information (MIB information) to the device information updating part 243, and requests the registration and updating of the device information to the device management information storing part 242.

In this manner, the device management apparatus 100 of this embodiment automatically manages the device management information 242D in cooperation with both the management information base acquiring part 244 and the device information updating part 243 (the device information of a device 200 which is one of the management object devices is registered and updated).

The device information excepting part 245 is a function element which excepts the device information managed in the device management information storing part 242. In a manner similar to that of the device information updating part 243, the device information excepting part 245 accesses the device management information storing part 242, and determines the storage area in which the device information of the exception device is stored. The device information excepting part 245 deletes the item value of the device information stored in the determined storage area, and deletes the storage area of the storage device as well.

The device information excepting part 245 receives an exception request from the device exception request part 232, performs the excepting process, and returns the result of the excepting process to the requesting part. This exception request indicates a user request that designates a corresponding network device as being excepted from the management objects (designation of an exception device).

When an exception request is received from the device exception request part 232, the device information excepting part 245 requests the trap setting part 247 to change the trap setting of the exception device to an OFF state.

The trap setting part 247 is a function element which performs a remote setting of the trap setting of the device 200 via the network (or a switching control of the ON/OFF setting).

The trap setting part 247 transmits a command (setting command) that sets the trap setting of the device 200 to an ON state or an OFF state, to the device 200.

In the device management apparatus 100 of this embodiment, the trap setting of an exception device is turned OFF in cooperation with both the device information excepting part 245 and the trap setting part 247.

The communication control part 31 is a function element which controls the communication between the device 200 and another device. Specifically, the communication control part 31 controls transmission of the device information (management information base) by a trap processing. If a change of the state of the device 200 is detected, the communication control part 31 acquires the newest device information from the management information base storing part 32 in which the management information base (MIB) information is stored in the storage area, and transmits the acquired device information to the device management apparatus 100 based on the network setting thereof.

The communication control part 31 executes the setting command received from the device management apparatus 100 to change the trap setting, and performs the device information transmitting processing (the trap processing) based on the changed trap setting.

As mentioned above, the device management function of this embodiment is provided by causing the respective function elements to perform the control process in cooperation with each other.

Next, the operation of the above-mentioned device management function will be described by referring to the sequence diagrams. The device management program (the function elements that provide the device management function) installed in the device management apparatus 100 is read from the storage device (for example, the HDD 108) and loaded to the RAM 104 by the CPU 106, and the CPU 106 performs the operation of the device management function of this embodiment as in the following.

FIG. 6A and FIG. 6B are diagrams showing examples of display screens related to the device exception of this embodiment.

As shown in FIG. 6A, a user views a displayed device list screen W1 which is generated by the Web page generating part 22 and received from the device management apparatus 100, selects devices 200 to be excepted from the management objects in the screen, and designates the exception devices as indicated by the black dots in FIG. 6A. In response, the device management apparatus 100 presents a displayed checking screen W2 as shown in FIG. 6B (which is generated by the Web page generating part 22) to the user for checking whether the exception process is to be performed before execution of excepting the device information of the designated exception devices from the device management information 242D. By viewing the checking screen W2, the user checks the exception devices and the trap setting thereof, depresses the OK button on the displayed screen, and requests execution of the excepting process.

Figure 7:
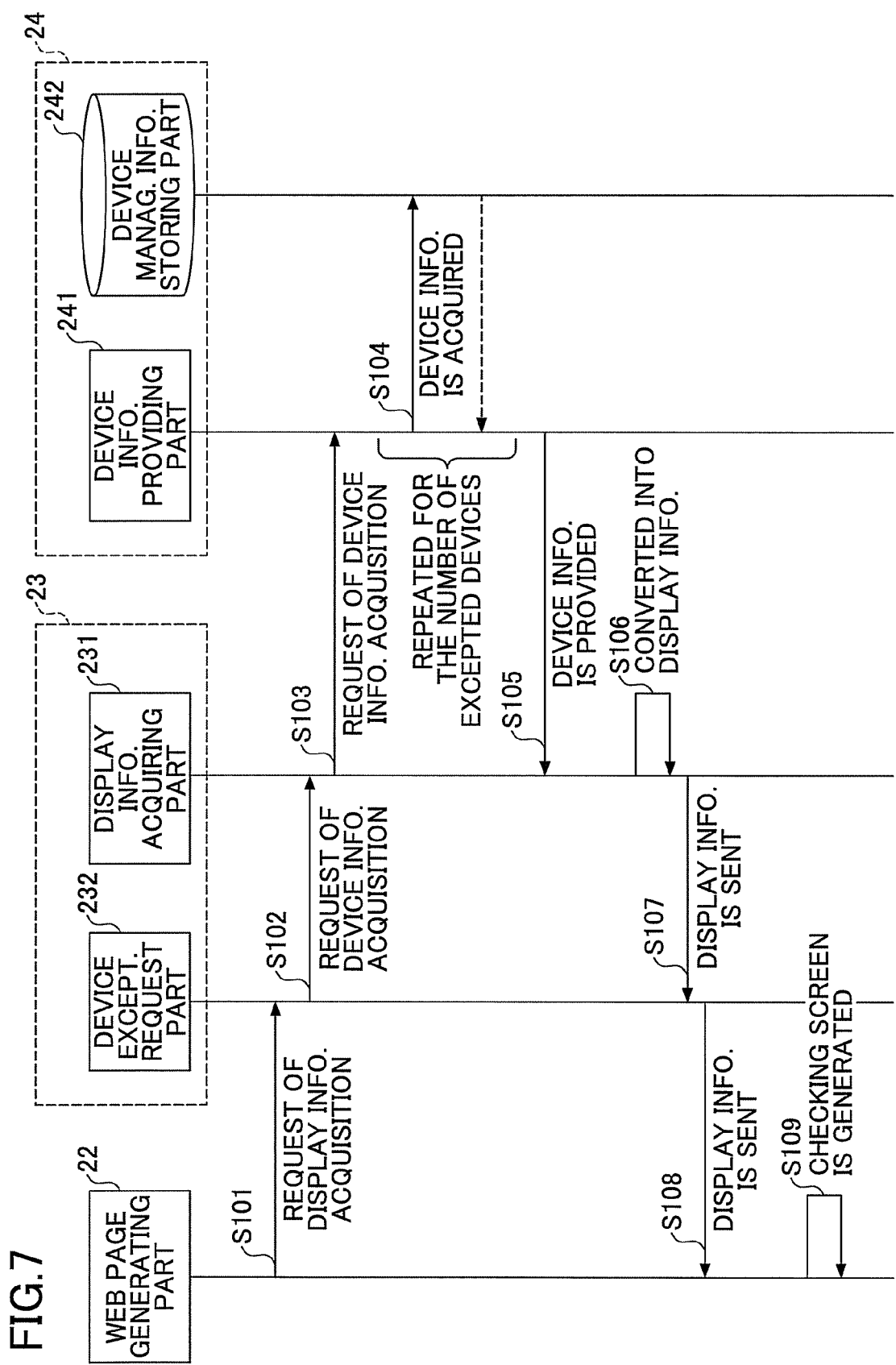
FIG. 7 is a sequence diagram for explaining a control process of the first embodiment which displays a checking screen of the device exception.

FIG. 7 is a sequence diagram for explaining a control process of this embodiment which displays the checking screen W2 of the device exception. A control process which displays the checking screen W2 before execution of the excepting process in the displaying processing is shown in FIG. 7.

As shown in FIG. 7, if the designation of the exception devices is received from the user through the display screen W1 of FIG. 6A, the device management apparatus 100 sends a request of acquisition of the display information for the checking screen before execution of the excepting process from the Web page generating part 22 to the device exception request part 232 provided in the front-end part 23 (step S101).

In response to this request, the device exception request part 232 sends a request of acquisition of the device information of the exception devices to the display information acquiring part 231 provided in the front-end part 23 (step S102).

In response to this request, the display information acquiring part 231 sends a request of acquisition of the device information of the exception devices to the device information providing part 241 provided in the device management part 24 (step S103).

The device information providing part 241 accesses the device management information storing part 242, and acquires the device information corresponding to the exception devices from the device management information 242D (step S104). At this time, the device information providing part 241 acquires the correspondence information by retrieving the device management information 242D based on the device identification information of each exception device received by the request.

In this manner, the device information providing part 241 acquires the device information of all the exception devices by repeating the same processing of the step S104 for the number of the exception devices designated by the user and received by the request.

The device information providing part 241 sends the acquired device information to the display information acquiring part 231 of the requesting source and supplies the device information thereto (step S105). That is, the device information of all the exception devices designated by the user is supplied from the device management part 24 to the front-end part 23.

The display information acquiring part 231 converts the received device information into display information (step S106), and transmits the display information to the device exception request part 232 of the requesting source (step S107).

The device exception request part 232 transmits the received display information to the Web page generating part 22 of the requesting source (step S108). That is, the display information including the device information of all the exception devices designated by the user is transmitted from the front-end part 23 to the Web page generating part 22.

As a result, the Web page generating part 22 generates the checking screen W2 (FIG. 6B) based on the received display information (step S109).

Accordingly, in the device management apparatus 100 of this embodiment, the checking screen W2 before execution of the excepting process is provided to the user.

Figure 8:
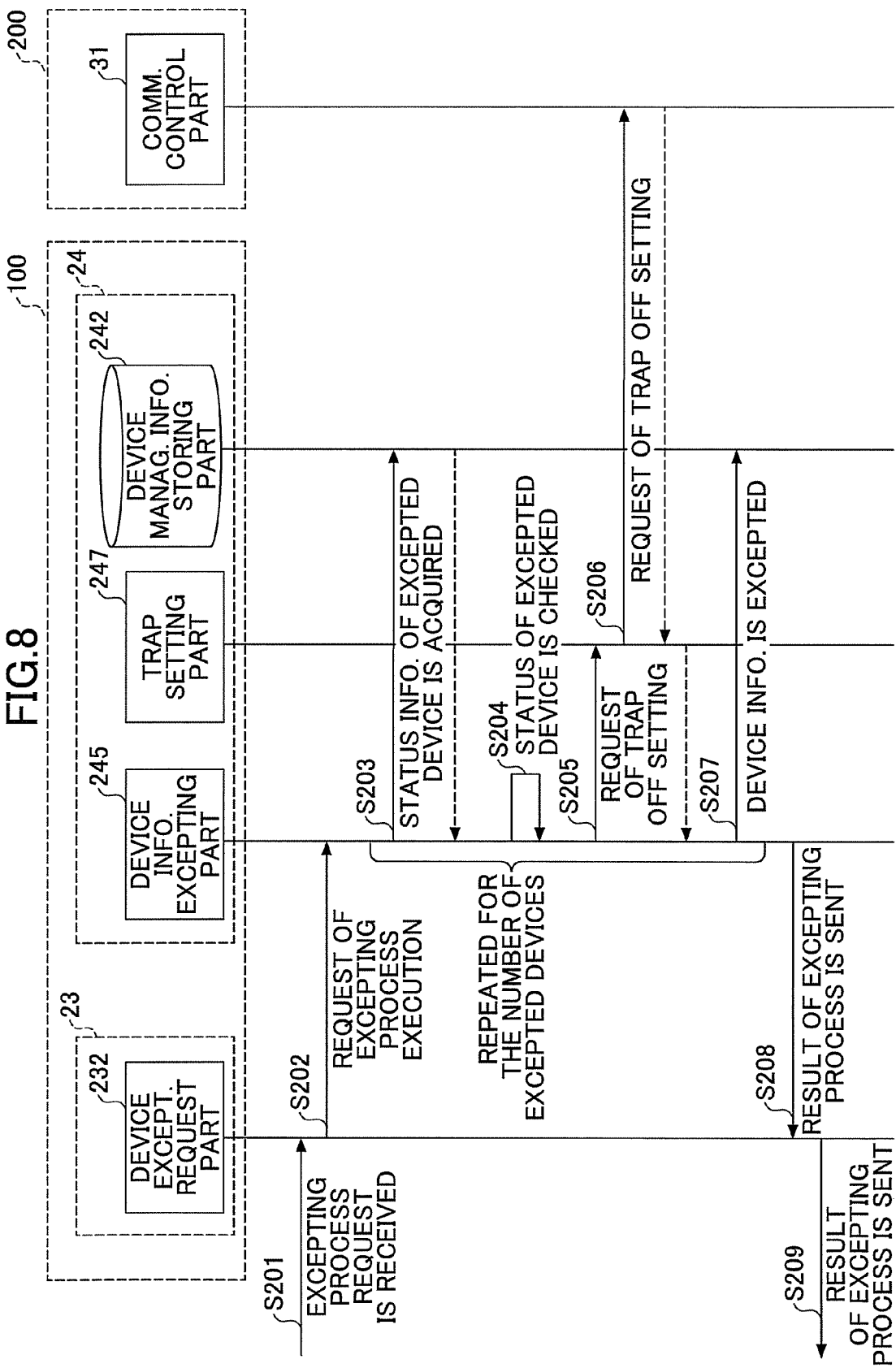
FIG. 8 is a sequence diagram for explaining a control process of the first embodiment which turns off the trap setting of exception devices.
Figure 9:
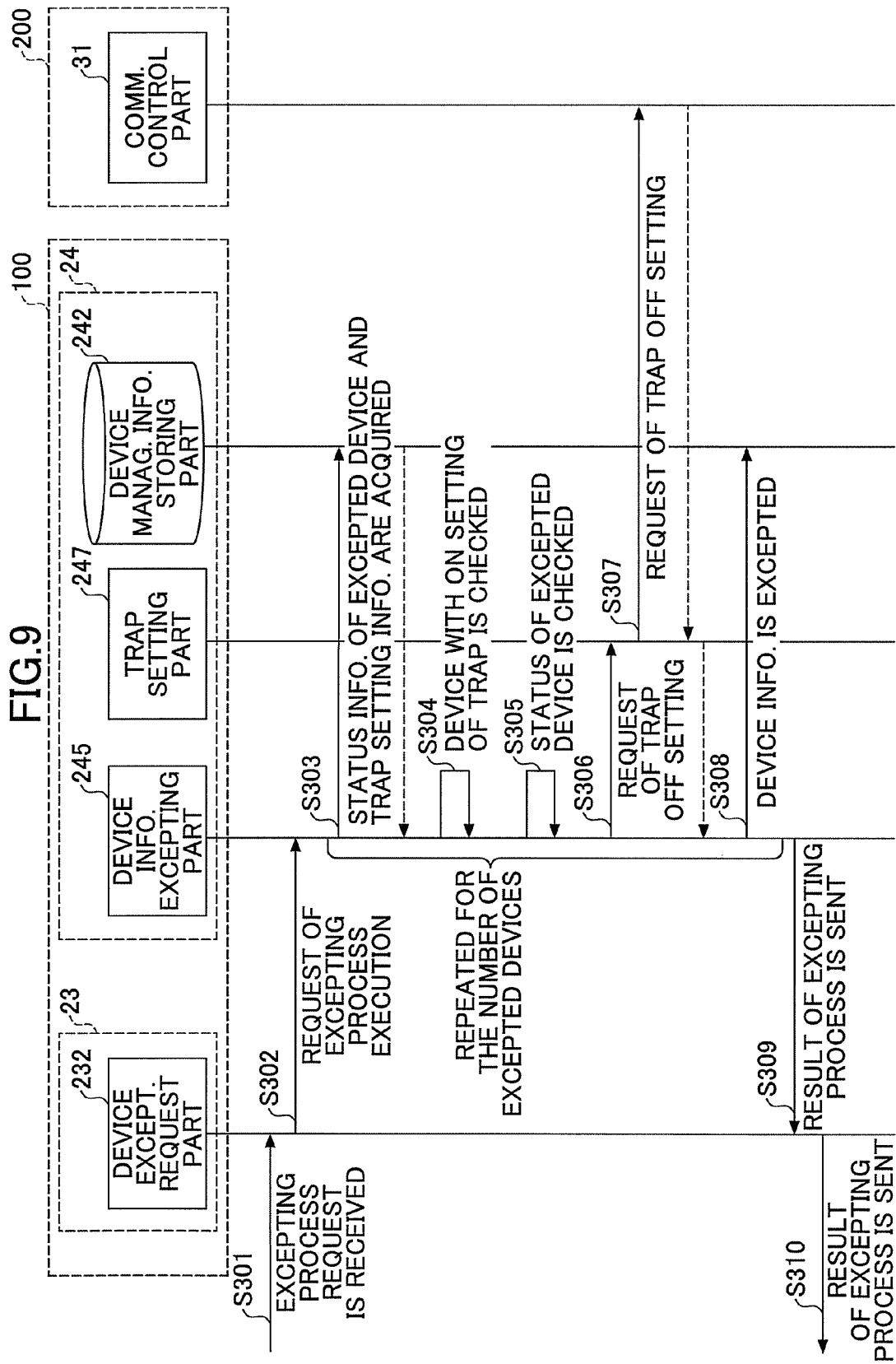
FIG. 9 is a sequence diagram for explaining a control process of the first embodiment which turns off the trap setting of exception devices.

Next, if an execution command of the exception process is received from the user through the checking screen W2 displayed by the display processing, the device management apparatus 100 performs the excepting process as shown in FIG. 8 or FIG. 9. In the following, two examples of a control process for the excepting process will be described.

FIG. 8 is a sequence diagram for explaining a control process of this embodiment which turns off the trap setting of the exception devices.

As shown in FIG. 8, if an execution request of the excepting process is received at the device exception request part 232 of the front-end part 23 (step S201), the device exception request part 232 in the device management apparatus 100 requests the device information excepting part 245 of the device management part 24 to execute the excepting process for deleting the device information of the exception devices (step S202).

Subsequently, the device information excepting part 245 accesses the device management information storing part 242, and acquires the status information included in the device information of a corresponding exception device from the device management information 242D (step S203). At this time, the device information excepting part 245 acquires the corresponding status information by retrieving the device management information 242D based on the device identification information of the exception device received by the request.

Subsequently, based on the acquired status information, the device information excepting part 245 checks the status of the exception device, and determines whether the exception device is in an active state that is capable of performing the communication (step S204). For example, when the value of the status information is "usable", "on-line", etc., the device information excepting part 245 determines that the exception device is in the active state that is capable of performing the communication.

On the other hand, when the value of the status information is "no reply", the device information excepting part 245 determines that the exception device is not in the active state.

When it is determined that the exception device is in the active state that is capable of performing the communication, the device information excepting part 245 performs processing of step S205.

Specifically, the device information excepting part 245 sends a request for turning OFF the trap setting of the exception device (which is checked as being in the active state), to the trap setting part 247 of the device management part 24 (step S205). In response to the request, the trap setting part 247 transmits a command (setting command) which turns OFF the trap setting of the exception device, to the device 200 (step S206).

As a result, the exception device 200 receives the command by using the communication control part 31, changes the trap setting of the device 200 to an OFF state, and changes the value of the trap setting information from "ON" to "OFF".

Thereby, in the exception device 200, according to the changed trap setting OFF, the trap processing under execution on the device 200 is stopped, and the device information thereof will not be notified to the device management apparatus 100.

Subsequently, the device information excepting part 245 accesses the device management information storing part 242, and deletes the corresponding device information of the exception device from the device management information 242D, regardless of the result of the checking in the step S204 (step S207). At this time, the device information excepting part 245 deletes the corresponding device information and the storage area thereof by accessing the device management information 242D based on the device identification information of the exception device received by the request.

In this manner, the device information excepting part 245 repeats the processing of the steps S203-S207 for the number of the exception devices designated by the user and received by the request, and deletes the device information of all the exception devices.

The device information excepting part 245 notifies the result of the excepting process to the device exception request part 232 (step S208), and the device exception request part 232 notifies the result of the excepting process to the requesting source (step S209). That is, the result of the excepting process of the exception devices designated by the user is notified from the device management part 24 to the front-end part 23.

In the device management apparatus 100 of this embodiment, when a device 200 is excepted from the management objects, the trap setting of the corresponding device is dynamically changed to an OFF state.

In the above-mentioned excepting process, the device information of all the exception devices is excepted, and only the trap setting of the exception devices being in the active state that is capable of performing the communication is turned OFF. For example, when some devices 200 being in an inactive state, such as a state in which the power is turned off or a state in which a particular device 200 is disconnected from the network, are included in the exception devices, the trap setting processing is skipped but the device information of all the exception devices is excepted. Thereby, it is possible for the device management apparatus 100 of this embodiment to perform smooth system operation regardless of the states of the devices 200, and the exception devices designated by the user can be smoothly excepted from the management objects.

FIG. 9 is a sequence diagram for explaining a control process of this embodiment which turns off the trap setting of the exception devices. In the control process of FIG. 9, only steps 303-308 differ from those of the control process of FIG. 8.

In the following, only the steps of the control process of FIG. 9 which differ from those of the control process of FIG. 8 will be described, and a description of the steps of the control process of FIG. 9 which are the same as corresponding steps in the control process of FIG. 8 will be omitted.

In the control process of FIG. 9, after an execution request sent by the device exception request part 232 in step S302 is received, the device information excepting part 245 accesses the device management information storing part 242 and acquires the status information and the trap setting information which are included in the device information of a corresponding exception device from the device management information 242D (step S303).

Subsequently, the device information excepting part 245 checks the trap setting of the exception device based on the acquired trap setting information, and determines whether the exception device is a device 200 which needs to change the trap setting (or determines whether it is necessary to turn OFF the trap setting of the exception device) (step S304).

For example, when the value of the trap setting information is "ON", the device information excepting part 245 determines that it is necessary to change the trap setting or that the trap setting of the exception device must be set to an OFF state. On the other hand, when the value of the trap setting information is "OFF", the device information excepting part 245 determines that effecting a setting change is unnecessary.

Subsequently, based on the acquired status information, the device information excepting part 245 checks the status of the exception device, and determines whether the exception device is in an active state that is capable of performing the communication (step S305).

When it is determined that the exception device is in the active state that is capable of performing the communication and that the exception device needs to change the trap setting, the device information excepting part 245 performs the processing of step S306.

Specifically, the device information excepting part 245 sends a request for turning OFF the trap setting of the exception device (which is checked as being in the active state and requiring effecting a setting change), to the trap setting part 247 of the device management part 24 (step S306). In response to the request, the trap setting part 247 transmits a command (setting command) which turns OFF the trap setting of the exception device, to the device 200 (step S307).

As a result, the exception device 200 receives the command by using the communication control part 31, changes the trap setting of the device 200 to an OFF state, and changes the value of the trap setting information from "ON" to "OFF".

Thereby, in the exception device, according to the changed trap setting OFF, the trap processing under execution on the device 200 is stopped, and the device information thereof will not be notified to the device management apparatus 100.

Subsequently, the device information excepting part 245 accesses the device management information storing part 242 and deletes the corresponding device information of the exception device from the device management information 242D regardless of the results of the checking in the steps S304 and S305 (step S308). At this time, the device information excepting part 245 deletes the corresponding device information and the storage area thereof by accessing the device management information 242O based on the device identification information of the exception device received by the request.

In this manner, the device information excepting part 245 repeats the processing of the steps S303-S308 for the number of the exception devices designated by the user and received by the request, and deletes the device information of all the exception devices.

In the above-mentioned excepting process, the device information of all the exception devices is excepted, and only the trap setting of the exception devices which are in the active state that is capable of performing the communication and require effecting a setting change is turned OFF. For example, in the exception device, it is possible that device 200 by which the trap setting is already turned off is also contained, and trap setting processing is skipped to such a device 200. Thereby, it is possible for the device management apparatus 100 of this embodiment to efficiently perform the trap setting processing of the exception devices. It is possible to shorten the processing time when many exception devices are designated.

As described in the foregoing, when an exception request for excepting a device 200 from the management objects is received (or when a change of the management state is detected), in the device management apparatus 100 of this embodiment, the trap setting of the exception device is set to an OFF state and the device information of the exception device is excepted from the device management information 242D currently stored in a predetermined storage area of the storage device, in cooperation with both the device information excepting part 245 and the trap setting part 247. That is, when the device 200 is deleted from the management objects, the device management apparatus 100 performs remote setting to dynamically change the trap setting of the corresponding device to an OFF state. In the device management apparatus 100 of this embodiment, by controlling the management state of the device 200, it is possible to present the useless communication from being performed by the trap processing of the device 200, and it is possible to reduce the communication load between the device management apparatus 100 and the device 200.

Second Embodiment

In this embodiment, the device management function which remotely controls the trap setting of a management object device according to the operating state of the device management system as well as the management state of the management object device is provided.

Generally, the operating states of the device management system may include a system start state, a system stop state, and a system end state. If the device information is transmitted to the device management apparatus by the trap processing of the device 200 when the device management system is in a system stop state or a system end state, a problem similar to the case where the device 200 is excepted from the management objects arises.

To eliminate the problem, the device management apparatus of this embodiment is arranged so that, when the operation of the device management system is ended (or stopped), a remote setting is performed to dynamically change the trap setting of management object devices to an OFF state.

Next, the device management function of this embodiment will be described. In this embodiment, the elements which are the same as corresponding elements in the first embodiment are designated by the same reference numerals, and a description thereof will be omitted.

Figure 10:
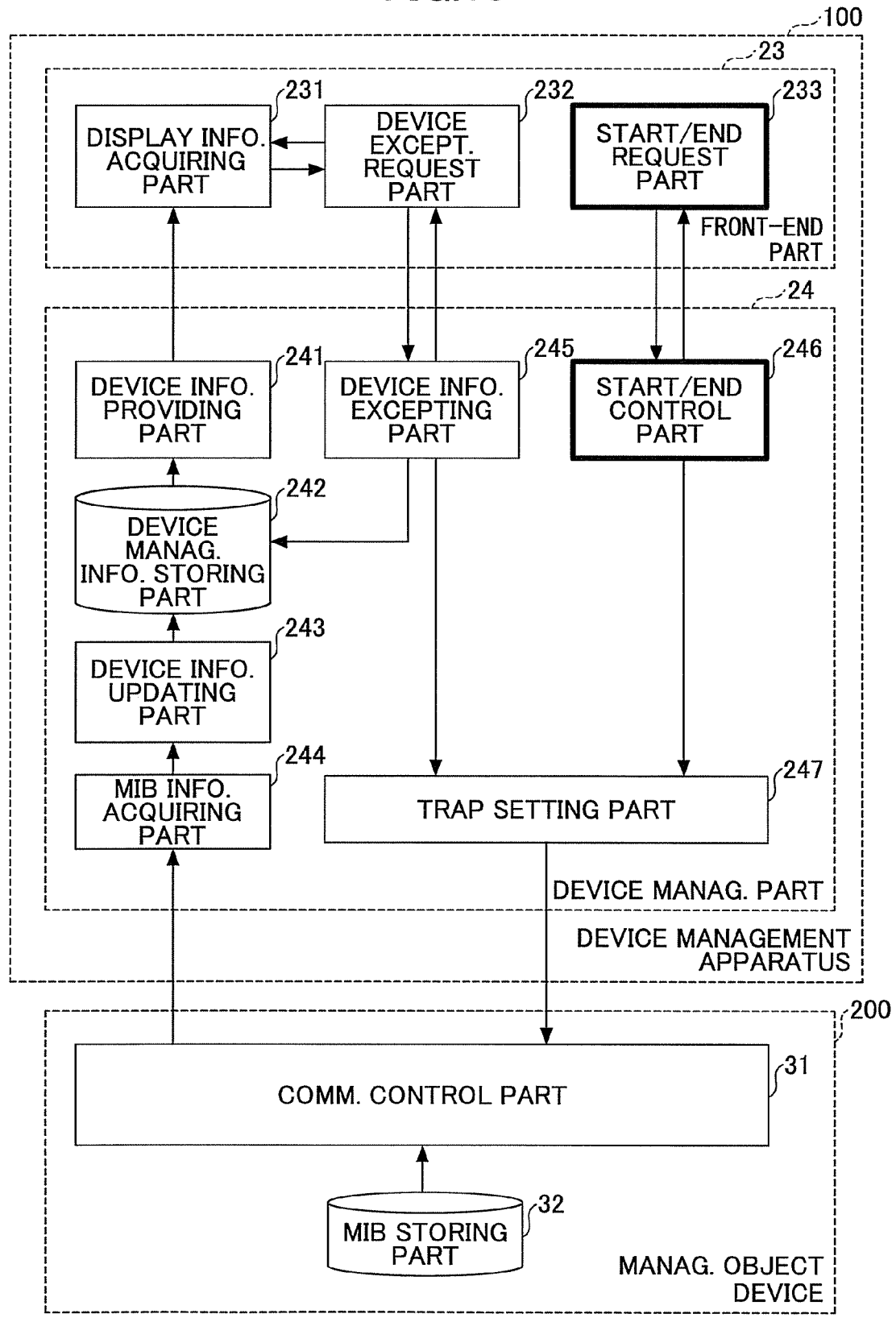
FIG. 10 is a diagram showing the functional composition of a device management system of a second embodiment of the present disclosure.

FIG. 10 is a diagram showing the functional composition of the device management system of this embodiment. As shown in FIG. 10, this embodiment differs from the first embodiment in that the device management apparatus 100 of this embodiment is arranged to further include a start/end request part 233 and a start/end control part 246.

The start/end request part 233 is a function element which is provided by executing the software program of the front-end part 23. The start/end control part 246 is a function element which is provided by executing the software program of the device management part 24.

The start/end request part 233 is a function element which requests the start/end control part 246 to control operation (start, stop, and end) of the device management function provided by the device management part 24. For example, the start/end request part 233 receives a start, stop or end request of the device management function input by a user in a displayed input screen which is generated and supplied by the Web page generating part 22.

The start/end control part 246 is a function element which controls the starting, stopping or ending operation of the device management function. When a start or end request from the start/end request part 233 is received, the start/end control part 246 starts or ends the operation of the device management function. When a stop request from the start/end request part 233 is received, the start/end control part 246 stops the operation of the device management function. Alternatively, in this case, a change of the operating state of the device management function may be detected, and the start/end control part 246 may dynamically change the operation of the device management function to a system stop state based on the detection result.

Alternatively, the start/end request part 233 may be arranged to request a transition (start→stop, start→end, and end→start) of the operation of the device management function in accordance with the request input by the user. Alternatively, the start/end request part 233 may be arranged to request a transition of the operation of the device management function based on a predetermined schedule using the internal clock (not shown) of the device management apparatus such that the operational transition may be dynamically controlled. In this case, the start/end control part 246 may be arranged to request the trap setting part 247 to perform the trap setting of the management object device to an ON state or an OFF state in accordance with the requested transition of the operation of the device management function.

As described above, the device management apparatus 100 of this embodiment is arranged so that the trap setting of the management object device is changed to an ON state or an OFF state in cooperation with both the start/end control part 246 and the trap setting part 247.

Next, the cooperative processing of the start/end request part 233, the start/end control part 246, and other function elements will be described.

FIG. 11 is a sequence diagram for explaining a control process of this embodiment which turns off the trap setting of the management object devices 200 at a time of a system end process. The control process shown in FIG. 11 may be applicable at a time of a system stop process.

As shown in FIG. 11, the start/end request part 233 of the front-end part 23 in the device management apparatus 100 receives an execution request of a system end process (step S401). The start/end request part 233 requests the start/end control part 246 of the device management part 24 to execute the system end process for ending the operation of the device management function (step S402).

Subsequently, the start/end control part 246 accesses the device management information storing part 242, and acquires the status information included in the device information of a corresponding management object device from the device management information 242D (step S403). At this time, the start/end control part 246 acquires the corresponding status information by retrieving the device management information 242D based on the device identification information.

Subsequently, the start/end control part 246 checks the status of the management object device based on the acquired status information, and determines whether the management object device is in an active state that is capable of performing the communication (step S404).

When it is determined that the management object device is in the active state that is capable of performing the communication, the start/end control part 246 performs processing of step S405.

Specifically, the start/end control part 246 sends a request for turning OFF the trap setting of the management object device (which is checked as being in the active state), to the trap setting part 247 of the device management part 24 (step S405). In response to the request, the trap setting part 247 transmits a command (setting command) which turns OFF the trap setting of the management object device, to the device 200 (step S406).

As a result, the management object device 200 receives the command by using the communication control part 31, changes the trap setting of the device 200 to an OFF state, and changes the value of the trap setting information from "ON" to "OFF".

Thereby, in the management object device, according to the changed trap setting OFF, the trap processing under execution on the device 200 is stopped, and the device information will not be notified to the device management apparatus 100.

In this manner, the start/end control part 246 repeats the processing of the steps S403-S406 for the number of the management object devices designated by the user and received by the request, and turns OFF the trap setting of the management object devices (which are checked as being in the active state).

After the above-mentioned trap setting processing is completed, the start/end control part 246 performs the requested system end process to end the operation of the device management function (step S407).

Thus, according to the device management apparatus 100 of this embodiment, the trap setting of the management object devices is dynamically changed to an OFF state at a time of a system end process.

FIG. 12 is a sequence diagram for explaining a control process of this embodiment which turns on the trap setting of the management object devices 200 at a time of a system start process.

As shown in FIG. 12, the start/end request part 233 of the front-end part 23 in the device management apparatus 100 receives an execution request of a system start process (step S501). The start/end request part 233 requests the start/end control part 246 of the device management part 24 to execute the system start process for starting the operation of the device management function (step S502).

As a result, the start/end control part 246 performs the requested system start process to start the operation of the device management function (step S503).

After the above-mentioned system start process is completed, the start/end control part 246 accesses the device management information storing part 242, and acquires the status information included in the device information of a corresponding management object device from the device management information 242D (step S504). At this time, the start/end control part 246 acquires the corresponding status information by retrieving the device management information 242D based on the device identification information.

Subsequently, based on the acquired status information, the start/end control part 246 checks the status of the management object device, and determines whether the management object device is in an active state that is capable of performing the communication (step S505).

When it is determined that the management object device is in the active state that is capable of performing the communication, the start/end control part 246 performs processing of step S506.

Specifically, the start/end control part 246 sends a request for turning ON the trap setting of the management object device (which is checked as being in the active state), to the trap setting part 247 of the device management part 24 (step S506). In response to the request, the trap setting part 247 transmits a command (setting command) which turns ON the trap setting of the management object device, to the device 200 (step S507).

As a result, the management object device 200 receives the command by using the communication control part 31, changes the trap setting of the management object device to an ON state, and changes the value of the trap setting information from "OFF" to "ON".

Thereby, in the management object device 200, according to the changed trap setting ON, the trap processing being stopped on the device 200 is restarted (the stop state of the trap processing is canceled), and the device information will be notified to the device management apparatus 100.

In this manner, the start/end control part 246 repeats the processing of the steps S504-S507 for the number of management object devices designated by the user and received by the request, and turns ON the trap setting of the management object devices (which are checked as being in the active state).

Thus, according to the device management apparatus 100 of this embodiment, the trap setting of the management object devices is dynamically changed to an ON state at a time of a system start process.

Subsequently, the start/end control part 246 notifies the result of the system start process to the start/end request part 233 (step S508), and the start/end request part 233 notifies the result of the system start process to the requesting source (step S509). That is, the result of the system start process is notified from the device management part 24 to the front-end part 23.

Alternatively, the trap setting processing of this embodiment of FIG. 11 and FIG. 12 may be arranged to incorporate the checking step (S304 in FIG. 9) which checks the necessity of a setting change of the trap setting of the device 200 as in the control process of the first embodiment shown in FIG. 9.

For example, the control process shown in FIG. 11 may be arranged as follows. Based on the trap setting information which is acquired together with the status information at the step S403, the start/end control part 246 checks the trap setting of the management object device, and determines whether the management object device is a device 200 which needs to change the trap setting (or determines whether it is necessary to turn OFF the trap setting of the management object device). For example, when the value of the trap setting information is "ON", the start/end control part 246 determines that it is necessary to change the trap setting or that the trap setting of the management object device must be set to an OFF state.

For example, the control process shown in FIG. 12 may be arranged as follows. Based on the trap setting information which is acquired together with the status information at the step S504, the start/end control part 246 checks the trap setting of the management object device, and determines whether the management object device is a device 200 which needs to change the trap setting (or determines whether it is necessary to turn ON the trap setting of the management object device). For example, when the value of the trap setting information is "OFF", the start/end control part 246 determines that it is necessary to change the trap setting or that the trap setting of the management object device must be set to an ON state.

Alternatively, the control process shown in FIG. 12 may be arranged to eliminate the following problem. In a case in which a certain device 200 has no trap function, the trap setting of the device 200 cannot be turned ON by using the remote setting of the device management apparatus 100. In such a case, after the processing of the step S507 is performed by the trap setting part 247, the trap setting information of the corresponding device 200 in the device management information 242D may be updated suitably based on the response received from the device 200.

As mentioned above, according to the device management apparatus 100 of this embodiment, if an execution request of the system end or stop process for ending or stopping operation of the device management system 1 is received, the functional cooperation of the start/end control part 246 and the trap setting part 247 is utilized so that the trap setting of the management object device is changed to an OFF state and thereafter the operation of the device management system 1 is ended or stopped. That is, the device management apparatus 100 is arranged to dynamically change the trap setting of the management object device to an OFF state at the time of ending or stopping the operation of the device management system 1.

In the device management apparatus 100 of the present disclosure, the trap setting of the device 200 is dynamically changed according to the management state of the device 200 or the operating state of the system, and it is possible to prevent the useless communication from being performed by the trap processing of the device 200, and therefore it is possible to reduce the communication load between the device management apparatus 100 and the device 200.

In the above-described embodiments, the device management function is provided by the CPU 106 of the device management apparatus 100 executing the program described in a programming language that is in conformity with the operating environment (platform). The program can be stored in a computer-readable recording medium 103a. Thereby, the program can be installed in the device management apparatus 100 through the drive device 103 by using the recording medium 103a in which the program is stored. Alternatively, because the device management apparatus 100 is provided with the interface unit 107, the program may be downloaded via the network and installed in the device management apparatus 100.

As described in the foregoing, according to the present disclosure, when excepting a device from the management objects, the trap setting of the device is dynamically changed according to the management state of the device or the operating state of the system, and it is possible to prevent the useless communication from being performed by the trap processing of the device, and therefore it is possible to reduce the communication load between the device management apparatus and the device.

The present disclosure is not limited to the specifically disclosed embodiments, and variations and modifications may be made without departing from the scope of the present disclosure.

What is claimed is:

1. A device management apparatus which is connected to a plurality of devices via a network and includes a processing unit, the processing unit comprising:

a trap setting part to define a trap setting of each of the plurality of devices;

a storing part to store device information of each of the plurality of devices, transmitted to the device management apparatus by a trap processing of each of the plurality of devices, in a predetermined storage area of a storage device as device management information of management object devices; and an excepting part to delete device information of a device from the device management information stored by the storing part, wherein, when an exception request for excepting exception devices from the management object devices is received, the trap setting part changes the trap setting of each of the exception devices to an OFF state and the excepting part deletes device information of the exception devices from the device management information stored by the storing part, wherein the trap setting part is configured so that, when the exception request is received, the trap setting of each of active devices, among the exception devices, which are determined as being in an active state capable of performing communication, based on status information of each active device included in the device management information, is changed to an OFF state, wherein the excepting part is configured to delete the device information of all the exception devices from the device management information, wherein the trap setting part is further configured so that, when the exception request is received, the trap setting of each of trap-ON devices, among the active devices, which are determined as being in an ON state of the trap setting, based on trap setting information of each trap-ON device included in the device management information, is changed to an OFF state.

2. The device management apparatus according to claim 1, wherein the device management apparatus comprises a start/end control part to control a start or an end of operation of a device management function of the device management apparatus, and wherein, when an end request of the device management function is received, the trap setting part changes the trap setting of each of the management object devices to an OFF state, and, after the changing of the trap setting by the trap setting part is completed, the start/end control part performs an end process that ends the operation of the device management function.

3. The device management apparatus according to claim 2, wherein, when a start request of the operation of the device management function is received, the start/end control part performs a start process that starts the operation of the device management function, and, after the start process performed by the start/end control part is completed, the trap setting part changes the trap setting of each of the management object devices to an ON state.

4. A device management method for use in a device management apparatus which is connected to a plurality of devices via a network and includes a processing unit, the processing unit including a trap setting part, a storing part that stores device information of each of the plurality of devices in a predetermined storage area of a storage device as device management information of management object devices, and an excepting part that deletes device information of a device from the device management information, the device management method comprising:
- receiving, by the excepting part, an exception request for excepting exception devices from the management object devices;
- changing, by the trap setting part, when the exception request is received, a trap setting of each of the exception devices to an OFF state; and
- deleting, by the excepting part, device information of the exception devices from the device management information stored in the predetermined storage area of the storage device,
- wherein when the exception request is received, the trap setting of each of active devices, among the exception devices, which are determined as being in an active state capable of performing communication, based on status information of each active device included in the device management information, is changed to an OFF state,
- wherein the deleting by the excepting part includes deleting the device information of all the exception devices from the device management information,
- wherein when the exception request is received, the trap setting of each of trap-ON devices, among the active devices, which are determined as being in an ON state of the trap setting, based on trap setting information of each trap-ON device included in the device management information, is changed to an OFF state.

5. A non-transitory computer-readable recording medium storing a program which, when executed by a computer, causes the computer to perform a device management method for use in a device management apparatus which is connected to a plurality of devices via a network and includes a processing unit, the processing unit including a trap setting part, a storing part that stores device information of each of the plurality of devices in a predetermined storage area of a storage device as device management information of management object devices, and an excepting part that deletes device information of a device from the device management information, the device management method comprising:
- receiving, by the excepting part, an exception request for excepting exception devices from the management object devices;
- changing, by the trap setting part, when the exception request is received, a trap setting of each of the exception devices to an OFF state; and
- deleting, by the excepting part, device information of the exception devices from the device management information stored in the predetermined storage area of the storage device,
- wherein when the exception request is received, the trap setting of each of active devices, among the exception devices, which are determined as being in an active state capable of performing communication, based on status information of each active device included in the device management information, is changed to an OFF state,
- wherein the deleting by the excepting part includes deleting the device information of all the exception devices from the device management information,
- wherein when the exception request is received, the trap setting of each of trap-ON devices, among the active devices, which are determined as being in an ON state of the trap setting, based on trap setting information of each trap-ON device included in the device management information, is changed to an OFF state.

* * * * *